United States Patent [19]
Bluemel et al.

[11] Patent Number: 5,703,785
[45] Date of Patent: Dec. 30, 1997

[54] INVENTORY CONTROL APPARATUS AND METHOD OF USING SAME

[76] Inventors: Mark R. Bluemel, 4671 Bermuda Ave., San Diego, Calif. 92107; King W. Lim, P.O. Box 99775, San Diego, Calif. 92169; Frederick Bluemel, 18 Williamsburg Dr., Fort Solonga, N.Y. 11768

[21] Appl. No.: 292,577

[22] Filed: Aug. 19, 1994

[51] Int. Cl.⁶ .................. G06F 17/00; G06G 7/48
[52] U.S. Cl. .............. 364/479.14; 235/383; 235/385
[58] Field of Search .................... 235/383, 385, 235/462; 364/479.14

[56] References Cited

U.S. PATENT DOCUMENTS

| | | | |
|---|---|---|---|
| 3,716,697 | 2/1973 | Weir | 235/383 |
| 4,016,537 | 4/1977 | Ray | 340/430 |
| 4,108,363 | 8/1978 | Susumu | 235/383 |
| 4,633,235 | 12/1986 | DeGennaro | 340/568 |
| 4,636,634 | 1/1987 | Harper et al. | 250/223 R |
| 4,750,197 | 6/1988 | Denekamp et al. | 379/58 |
| 4,839,875 | 6/1989 | Kuriyama et al. | 369/14 |
| 4,866,661 | 9/1989 | De Prins | 235/382 |
| 5,073,078 | 12/1991 | Merlo | 414/274 |
| 5,074,368 | 12/1991 | Bullivant | 177/50 |
| 5,303,214 | 4/1994 | Kulakowski et al. | 369/34 |

*Primary Examiner*—Reba I. Elmore
*Assistant Examiner*—Robert J. Dolan
*Attorney, Agent, or Firm*—Bernard L. Kleinke; Peter P. Scott

[57] ABSTRACT

The inventory control apparatus and method includes a sensor device connected to a detection device to generate an indicating signal in response to the change of status of an object by its removal or deposit relative to the sensor device. An indicating device is connected to the detection device and signals the change of status of the object relative to the sensor device. The signalling of the change of status is terminated either manually or after a predetermined time delay interval.

1 Claim, 4 Drawing Sheets

INVENTORY CONTROL APPARATUS AND METHOD OF USING SAME

TECHNICAL FIELD

The present invention relates in general to an inventory control apparatus, and a method of using it. The invention more particularly relates to an inventory control device which detects the removal of goods from a controlled area, and a method of using such an inventory control device.

BACKGROUND ART

Maintaining a complete and up to date inventory of a merchant's stock on hand is an important function of all businesses which vend goods. These inventory tracking, or control, activities provide the merchant with essential information, such as the quantity of a particular type of goods that have been sold and the remaining quantity of the goods. With this information, the merchant can determine when it is time to purchase replacement goods, and the quantity of replacement goods required to meet the demand for the goods.

Many types of inventory control systems are known which are capable of such inventory control functions, including computerized systems which track individual items with universal product code (UPC) labels at the point of sale. As a particular item is purchased, the associated product code is entered into the computer system, usually by scanning the product code with an optical reading device.

After a predetermined period of time, the number of items having like product codes are summed to provide an accurate count of the number of like items were sold during the predetermined period of time. The resulting sum can be compared to the number of like items on hand prior to the predetermined period of time to determine the remaining stock on hand. When the remaining stock on hand is equal to or less than a desired amount, which is calculated according to a perceived demand for the items in the future, the computerized inventory control system generates a low supply signal. Upon receipt of the low supply signal, the merchant takes the appropriate steps to replenish the depleted inventory.

While such an inventory control system adequately tracks the flow of inventory, its use for other functions, such as theft prevention, is severely limited. Theft, in the form of shoplifting, is an expensive problem facing many merchants. This is especially true for merchants who display large quantities of small items within the reach of customers. A shoplifter can easily reach the item, tuck it away under the shoplifter's clothes, and walk out of the merchant's store undetected. In addition, the item which is stolen in such a manner goes unaccounted for under the existing inventory control system.

In order to reduce the number of thefts and to monitor the inventory of a store, theft prevention devices have been installed in stores. The theft prevention devices installed are separate and distinct from the computerized inventory control systems described previously. Although separate and distinct, the theft prevention devices and the computerized inventory control systems cooperate to provide the dual functions of theft prevention and inventory monitoring. An example of a theft prevention system which works in concert with the computerized UPC inventory system comprises a cabinet with transparent doors.

The cabinet is stocked with items which the merchant wishes to protect from theft. These products are usually higher priced items which can be easily stolen by shoplifters, such as cigarettes and cosmetics. The theft prevention system further includes an alarm system to indicate when the cabinet doors have been opened. Opening the doors may cause an audible alarm to sound or a visual indicator to be actuated. In this way, the merchant is made aware of the removal of items from the cabinet as a result of the doors being opened.

Once the item or items are removed by the customer, and the alarm system has been activated, the customer eventually proceeds to the check out counter to make the purchase. At the check out counter the product code is entered into the computerized inventory system and the inventory is thereby updated.

While such a combination of theft prevention system and computerized inventory control system provides the merchant with security and inventory monitoring abilities, it is extremely inefficient. For example, a customer may open the doors to the cabinet to remove items from within, thereby initiating the alarm system. Because of the initiation of the alarm system, the merchant is aware that the doors have been opened and that probably at least one item from within has been removed. But there is no way for the merchant to know exactly which items have been removed from the cabinet, nor can the merchant know how many items have been removed.

A clever shoplifter will recognize that several items can be removed from the cabinet at the same time without the merchant knowing exactly how many items were removed. Thus, all but one of the items can be hidden from view in the shoplifter's clothing without the merchant realizing what has occurred.

As the alarm was set off, the shoplifter is aware that the merchant has been put on notice. Thus, the shoplifter can pay for one item only and leave the store having stolen several of the merchant's items. To make matters worse, the merchant has no record of the hidden items which were purloined. Thus, the inventory control system is not properly updated.

Furthermore, the inventory control apparatuses utilizing the cabinets are expensive and not very flexible. In this regard, the items to be used in conjunction with the inventory control system have to be removed from their shelves and placed in the special cabinet. The number, and physical characteristics, of the items are limited by the physical characteristics of the cabinet.

Therefore, it would be highly desirable to have an inventory control apparatus which is highly flexible and portable. In this way, items to be monitored can be left in place on existing shelving.

Due to the extent of loss sustained resulting from the inefficiency of the foregoing combination of theft prevention system and inventory control system, a new combination of theft/inventory systems was developed. Under the new combination of theft/inventory systems, each item was provided with a magnetic device. The theft portion of the system further included a magnetic sensing device which would sense the magnetic device attached to the items. The sensing device was positioned between the check out counter and the exit doors of the store.

In operation, the customer takes the desired item to the check out counter. The product code is entered, thereby updating the inventory. After the customer pays for the item, the magnetic device is removed from the item, or it is left on the item but it is deactivated. Thus, when the customer exits the store, the theft prevention system is not activated. In this way, a theft prevention system and an inventory control system are integrated in an efficient manner.

Unfortunately, such a system is impractical for a smaller store. The expense of implementing such a system is prohibitive for a merchant trying to operate a mini-mart or the like. The cost of purchasing items is increased due to the addition of the magnetic devices.

Therefore, it would be highly desirable to have a new and improved inventory control apparatus that integrates an inventory monitoring system with a theft control system, which can be used with items without magnetic devices and which is relatively inexpensive to manufacture.

Such a new and improved inventory control apparatus should be versatile enough for use in a variety of applications, including the monitoring of the contents of postal receptacles.

DISCLOSURE OF INVENTION

Therefore, the principal object of the present invention is to provide a new and improved inventory control apparatus, wherein the inventory control apparatus can be used with items as is without the need to attach extraneous devices to each item, and which is relatively inexpensive to manufacture.

Another object of the present invention is to provide such an inventory control apparatus which is highly flexible and portable, making it suitable for use in a number of locations and situations, including the monitoring of postal receptacles for the receipt of postal pieces therein.

Briefly, the above and further objects of the present invention are realized by providing a new and improved inventory control apparatus, which can be used according to a novel method of the present invention.

The inventory control apparatus and method includes a sensor device connected to a detection device to generate an indicating signal in response to the change of status of an object by its removal or deposit relative to the sensor device. An indicating device is connected to the detection device and signals the change of status of the object relative to the sensor device. The signalling of the change of status is terminated either manually or after a predetermined time delay interval.

The inventory control apparatus is extremely versatile and can be utilized with existing shelving, and can be adapted to accommodate any number of items having various sizes and shapes, and can also be used to monitor the contents of a postal receptacle.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
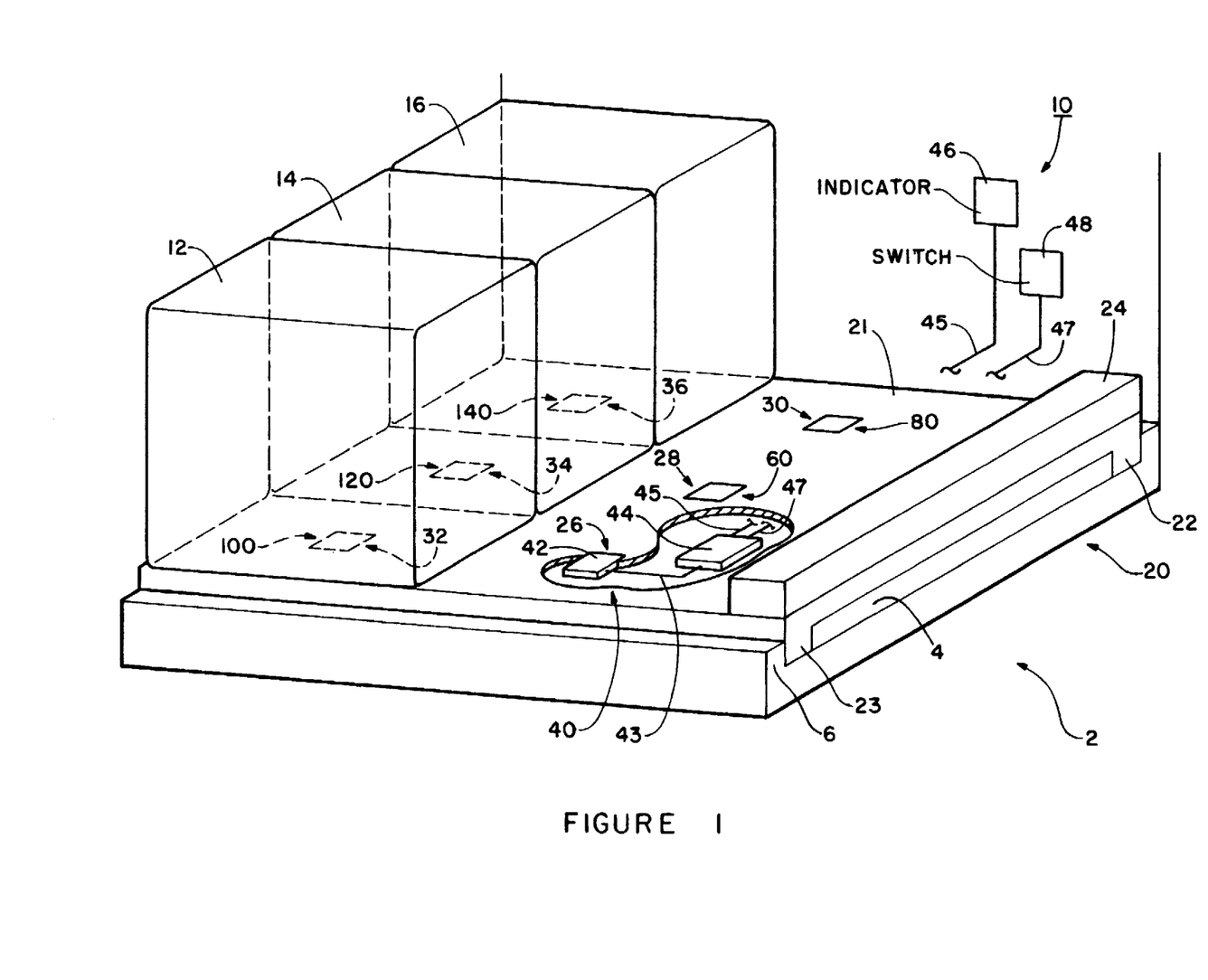
FIG. 1 is a perspective view of an inventory control apparatus, which is constructed in accordance with the present invention.

Referring now to the drawings, and more particularly to FIG. 1 thereof, there is shown an inventory control apparatus 10 which is constructed according to the present invention. Inventory control apparatus 10, and the method of using it, facilitates the monitoring of objects, such as objects 12, 14 and 16, in a relatively inexpensive manner. In this regard, inventory control apparatus 10 does not require an elaborate framework for support. Instead, existing shelving, such as shelf 2, is utilized to support the inventory control apparatus 10. Furthermore, inventory control apparatus 10 is highly transportable and can be relocated as desired at minimum expense to the user.

Inventory control apparatus 10 includes a base member 20 having openings 26, 28, 30, 32, 34 and 36 therein, and object detection devices 40, 60, 80, 100, 120 and 140 located immediately adjacent to the openings 26, 28, 30, 32, 34 and 36, respectively. Object detection devices 40, 60, 80, 100, 120 and 140 are partially disposed within the openings 26, 28, 30, 32, 34 and 36 to detect the status of objects, such as objects 12, 14 and 16, as to their presence or absence in the proximity of the openings 26, 28, 30, 32, 34 and 36.

In operation, base member 20 is initially positioned on shelf surface 4. Objects 12, 14, 16 and others (not shown), are placed over openings 32, 34, 36 26, 28 and 30, thereby obstructing the openings 32, 34, 36, 26, 28 and 30. For the sake of clarity, objects have not been shown over openings 26, 28 and 30.

As an object is removed from its position above its associated opening, such as removing an object (not shown) from its position above opening 26, the opening 26 is no longer obstructed and object detection device 40 detects this occurrence. Upon detecting this event, object detection device 40 indicates that such an event has occurred. In this way, the user is informed of the removal of the object. Similarly, other objects which have been placed over the remaining openings 28, 30, 32, 34 and 36, will be detected when they are removed from their respective opening.

Considering now base member 20 in greater detail, base member 20 includes planar member 21 integrally connected to a front support member 23 and a rear support member 22 to elevate the planar member 21 above upper surface 4 of shelf 2. An outer lip member 6 integrally connected to upper surface 4 abuts front support member 23 to prevent inventory control apparatus 10 from sliding off of shelf 2. Base member 24 further includes a power source 24 to energize the object detection devices 40, 60, 80, 100, 120 and 140.

Openings 26, 28, 30, 32, 34 and 36 penetrate through planar member 21 and are arranged in evenly spaced rows and columns. The distance between the adjacent rows and columns of openings 26, 28, 30, 32, 34 and 36 is dependent upon the foot print of the objects to placed on planar surface 21, such as objects 12, 14 and 16. In this regard, each object placed on planar member 21 obstructs an associated opening and permits the remaining objects on planar surface 21 to obstruct their associated openings. The preferred arrangement of openings 26, 28, 30, 32, 34 and 36 is in rows and columns as shown in FIG. 1. However, other arrangements of openings 26, 28, 30, 32, 34 and 36 are also contemplated. For example, a circular arrangement of openings might be suitable for use with a circular base member.

Considering now the object detection devices 40, 60, 80, 100, 120 and 140 in greater detail, only object detection device 40 will be considered hereinafter in greater detail as object detection devices 40, 60, 80, 100, 120 and 140 are substantially similar.

The object detection device 40 includes a sensor device 42 disposed in opening 26 to sense the presence of an object (not shown), in its desired location above opening 26, wherein the sensor device 42 is substantially adjacent to the object when in its desired location. The sensor device 42 generates a situated signal when the object is deposited near the opening 26, and generates a removed signal when the object is removed from its position above opening 26, indicating a change in status of the object's location. In the preferred embodiment, the sensor device 42 is a photoresistor. It will be understood by one skilled in the art that other transducers, including proximity detectors, can be effectively used in place of a photoresistor.

The object detection device 40 further includes a detection device 44 disposed between the planar member 21 and upper surface 4, and electrically connected to the sensor device 42 by conductor 43 to receive the signals generated by sensor device 42. In response to receiving the signal indicating that the status of the object has been changed, detection device 44 generates an indicating signal for activating an annunciating or indicating device 46. Indicating device 46 is electrically connected to detection device 44 by conductor 45 to provide a perceptible indication that the object has been removed from its position near the sensor device 42. In the preferred embodiment, indicating device 46 is a light emitting diode, however, other visual indicators, as well as audio indicators or speakers, may be used.

A switch device 48 is electrically connected to detection device 44 by conductor 47. Switch device 48 provides the user with the ability to deactivate the indicating device 46 after it has been activated by the indicating signal. The switch device 48 can be a manually operated mechanical switch or an electrically activated electrical switch, wherein the electrical switch may be maintained in a closed position for a desired period of time. In the preferred embodiment, the electrical switch is maintained in its closed position for a period of time between about 1 second and about 10 seconds.

It will be understood by one skilled in the art that the other object detection devices 60, 80, 100, 120 and 140 also have annunciating or indicating devices and switch devices associated therewith. However, these indicating and switch devices have not been shown for ease of understanding. Furthermore, it is contemplated that the indicating devices and switching devices for all of the object detection devices 40, 60, 80, 100, 120 and 140 could be embodied in a computer to control and process information received from the object detection devices 40, 60, 80, 100, 120 and 140.

In operation, objects, such as objects 12, 14 and 16, are positioned over the openings, such as openings 26, 28, 30, 32, 34 and 36, thereby completely covering the openings 26, 28, 30, 32, 34 and 36. In this obstructed position, sensor device 42 generates the electrical situated signal which is representative of the object (not shown) being deposited near the sensor device 42.

As the object is removed from its position near its associated opening 32, sensor device 42 generates an electrical removed signal which is representative of the object being removed from its position near sensor device 42.

Detection device 44 receives the signals generated by sensor device 42. While the situated signal is received, detection device 44 remains inactive. Upon the receipt of the removed signal, detection device 44 responds by generating an electrical indicating signal.

The indicating signal is transmitted to indicating device 46, which responds by becoming illuminated. Once the removal of object has been acknowledged by the user, switch device 48 is operated to extinguish indicating device 46.

From the foregoing, it will be understood that inventory control apparatus 10 provides an inexpensive mechanism, and a method of using it, which is easily adapted for use with a variety of products and which is highly portable.

Figure 2:
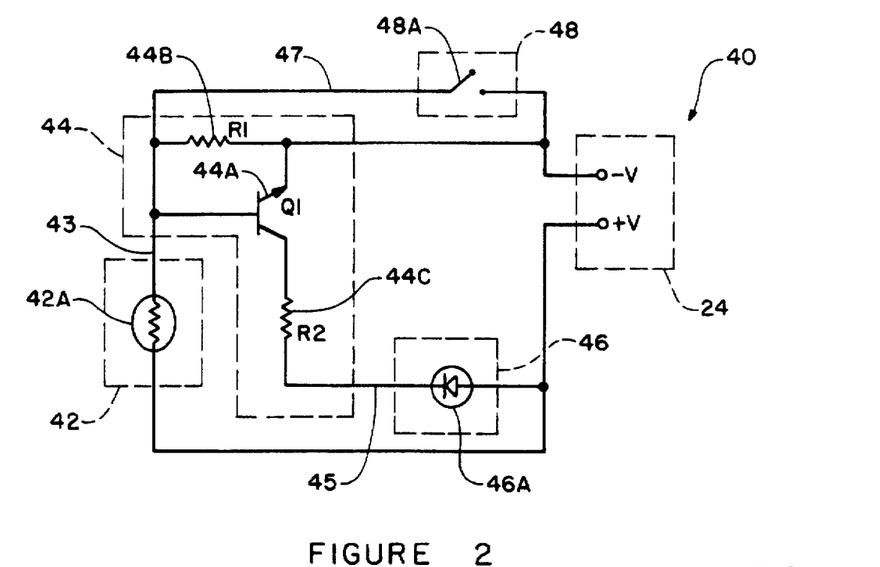
FIG. 2 is a schematic diagram of an object detection device of the inventory control apparatus of FIG. 1, which is constructed according to the present invention.

Considering now the object detection device 40 in greater detail with reference to FIG. 2, the sensor device 42 includes a photoresistor 42A connected between the +V terminal of power source 24 and the detection device 44 via conductor 43. The resistance of photoresistor 42A varies according to the amount of light incident thereon. In this regard, the resistance of photoresistor 42A is relatively high when no light is incident on it and is relatively low when light strikes the photoresistor 42A. Thus, the state of high resistance of photoresistor 42A is representative of a situated signal and the state of low resistance is representative of a removed signal.

The detection device 44 includes a transistor 44A, such as a 2N4401 transistor sold by Radio Shack, model number 276-2058, to generate an indicating signal. The base of the transistor 44A is connected to conductor 43 and a 2,000 ohm resistor 44B is connected between conductor 43 and the emitter of the transistor 44A to facilitate the switching of the transistor 44A. The detection device 44 further includes a 1,000 ohm resistor 44C connected between the collector of the transistor 44A and the indicating device 46.

The indicating device 46 is connected between the resistor 44C and the +V terminal of the power source 24, and includes a light emitting diode 46A which is activated in response to receiving the indicating signal, and which visually indicates that the sensor device 42 has generated a removed signal.

The switch device 48 includes a mechanically operated switch 48A and is connected in parallel to the resistor 44B between conductor 43 and the -V terminal of the power source 24 to facilitate the deactivation of the indicating device 46.

In operation, the photoresistor 42A resists the flow of current therethrough while an object is deposited above to the photoresistor 42A, thereby generating the situated signal. As the object is removed from its position near the photoresistor 42A, the resistance of the photoresistor 42A is decreased, generating the removed signal and increasing the voltage at the base of the transistor 44A.

Once the voltage at the base of the transistor 44A is sufficient to cause the transistor 44A to be properly biased, the transistor 44A acts as a switch and current is permitted to flow between its collector and emitter, thereby generating the indicating signal. As a result of the generation of the indicating signal, current flows through the light emitting diode 46A, causing it to be activated.

When desired, the light emitting diode 46A is deactivated by mechanically closing the switch 48A. The closing of the switch 48A reduces the voltage at the base of the transistor 44A to about the voltage at the -V terminal of the power source 24. As a result, the transistor 44A is no longer properly biased for generating the indicating signal and the transistor 44A then switches back, thereby interrupting the flow of current between the collector and emitter of the transistor 44A, and terminating the indicating signal.

Figure 3:
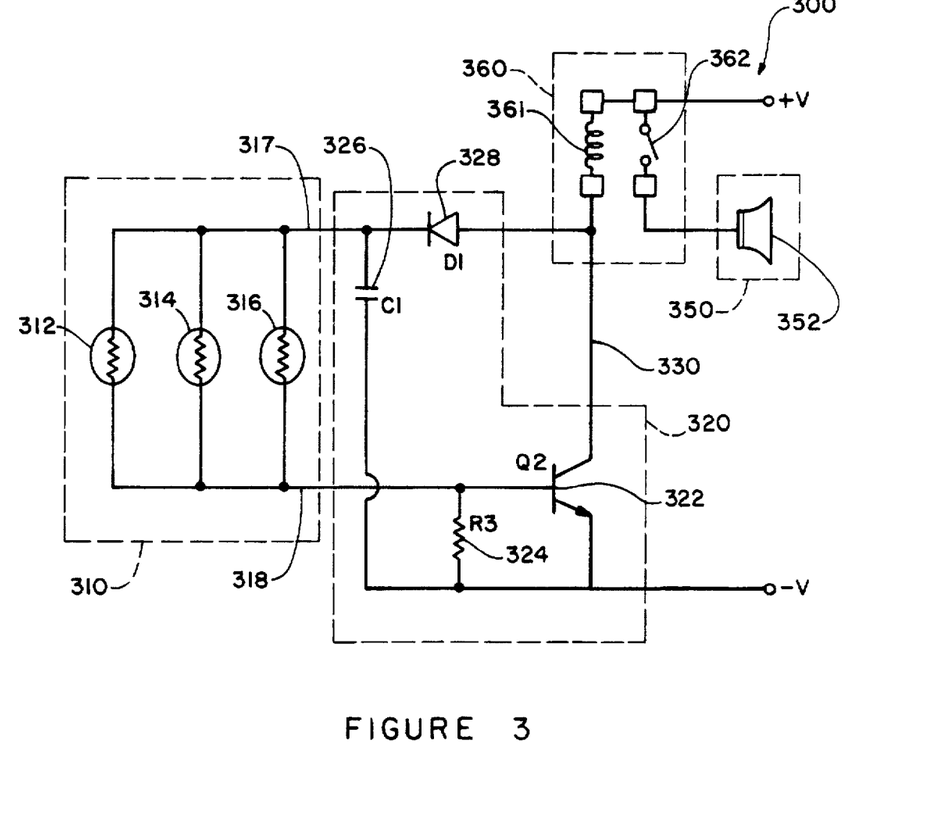
FIG. 3 is schematic diagram of another object detection device, which is constructed according to the present invention.

Referring now to FIG. 3, there is shown another object detection device 300 which is also capable of being used with inventory control apparatus 10 of FIG. 1. Object detection device 300 includes a sensor device 310, a detection device 320 connected to the sensor device 310 to generate an indicating signal, an annunciator or indicating device 350 responsive to the indicating signal, and a switch device 360 to deactivate the indicating device 350.

Object detection device 300 is capable of sensing the removal of any one of a plurality of objects, such as objects 12, 14 and 16 of FIG. 1. In this regard, the sensor device 310 of object detection device 300 includes photoresistors 312, 314 and 316 connected between nodes 317 and 318 in a parallel arrangement. Photoresistors 312, 314 and 316 are substantially similar to photoresistor 212. The removal of an object from its position near any one of photoresistors 312, 314 or 316 will generate a removed signal.

Detection device 320 is connected to the sensor device 310 at nodes 317 and 318, and includes a transistor 322 whose base is connected to node 318 to generate an indicating signal. A 2,000 ohm resistor 324 is connected between the base and emitter of the transistor 322 to provide a biasing voltage to switch the transistor 322, wherein the resistor 324 and the emitter of the transistor 322 are connected at a −V terminal of a power source (not shown).

The detection device 320 further includes a 1,000 microfarad capacitor 326 connected between node 317 and the −V terminal to store electrical energy, and a diode 328 connected between the node 317 and the collector of the transistor 322 to control the discharging of capacitor 326.

The switching device 360 is connected to detection device 320 at a node 330 connecting the diode 328 and the collector of the transistor 322 to activate indicating device 350 for a period of time in response to the indicating signal. The switching device 360 includes a relay coil 361 and a relay contact 362 operating between an on and an off position to control the flow of energy to an annunciator or indicating device 350.

The relay contact 362 is switchably connected to the indicating device 350, such as a speaker 352. In the off position, as shown in FIG. 3, the relay contact 362 does not activate speaker 352. However, upon receipt of an indicating signal, the relay contact 362 is closed to the on position, thereby activating speaker 352 for the length of time that the indicating signal is received.

In operation, objects, such as objects 12, 14 and 16 of FIG. 1, are placed over the photoresistors 312, 314 and 316. The power source (not shown) is applied across terminals −V and +V, thereby charging capacitor 326. In this regard, electrical current travels between the +V terminal, the relay coil 361, the diode 328, the capacitor 326, and the −V terminal. The transistor 322 is initially switched off to facilitate the charging of the capacitor 326.

Upon the removal of an object, the resistance of the associated photoresistor, such as photoresistor 316, is decreased, generating a removed signal. As a result, the voltage at the base of the transistor 322 is increased, causing the transistor 322 to be properly biased for switching on, wherein current is transmitted between the collector and emitter of the transistor 322 and generating an indicating signal.

In the on position, the transistor 322 permits the flow of current through the relay coil 361 to increase. The increased current flow actuates the switching device 360, causing the relay contact 362 to close. In the closed position, the relay contact 362 permits current to flow to the speaker 52 to generate an audible signal.

Simultaneously with the switching of the transistor 322 to the on position, the capacitor 326 is discharged. The diode 328 prevents the capacitor 326 from discharging directly to node 330. Instead, the capacitor 326 discharges through the photoresistor 316 to maintain the voltage at the base of the transistor 322 for a period of time. The period of time is based on the RC constant of resistor 324, photoresistor 316, and capacitor 326, and can be adjusted as desired.

Once the capacitor 326 has completely discharged, the voltage at the base of the transistor 323 decreases, causing the transistor 322 to switch off. This results in the current flow between its collector and emitter being interrupted. As a result, the current flow through relay coil 361 decreases and relay contact 362 is opened, terminating the flow of current to the speaker 352.

Figure 4:
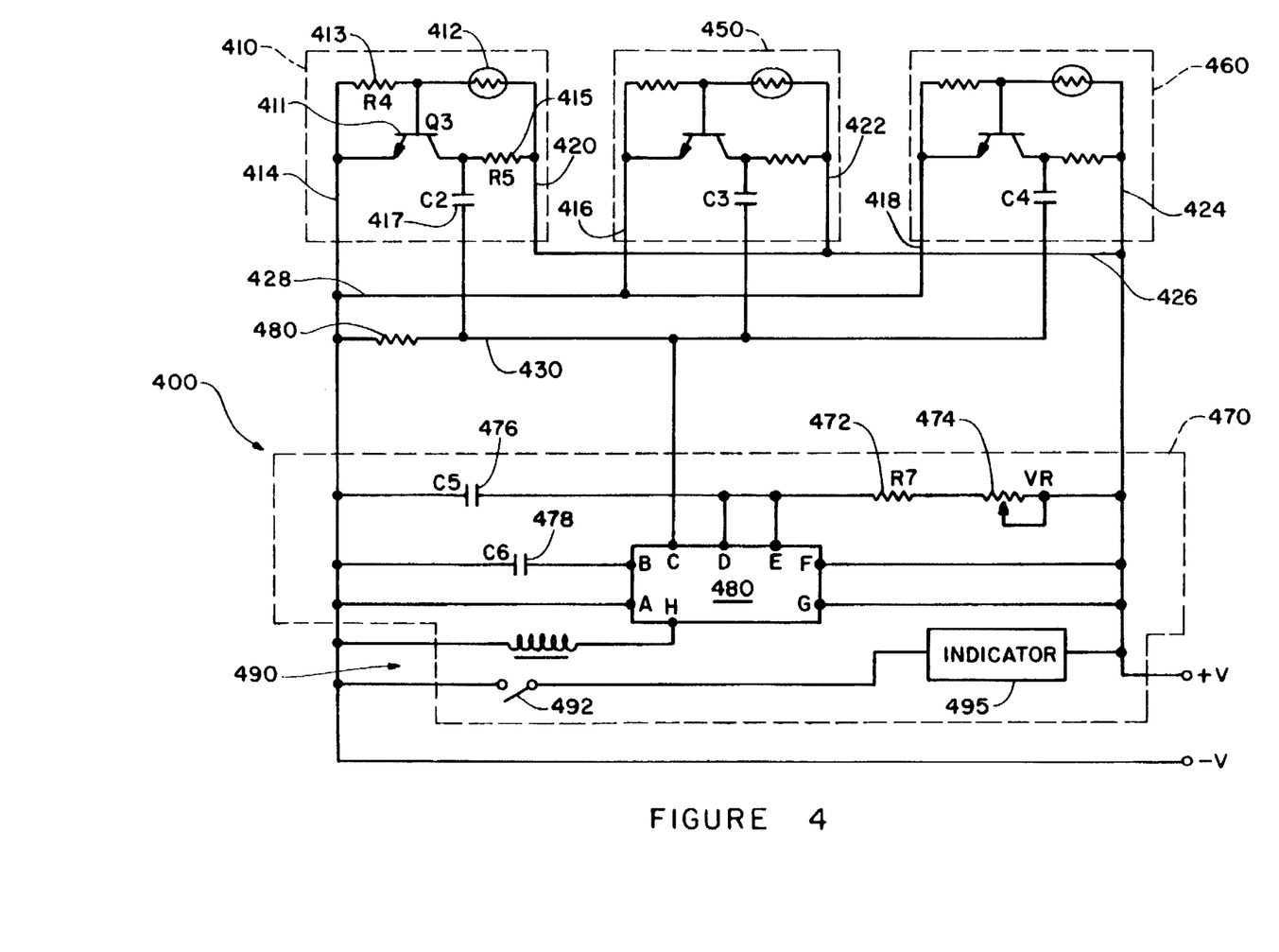
FIG. 4 is a schematic diagram of yet another object detection device, which is constructed according to the present invention.

Referring now to FIG. 4, there is shown yet another object detection device 400. Object detection device 400 is used in conjunction with a base member having openings therein, such as base member 20 of FIG. 1 having openings 26, 28 and 30.

Object detection device 400 includes monitoring devices 410, 450 and 460 interconnected at nodes 426, 428 and 430 to independently detect the presence and removal of a similar number of objects, such as objects 12, 14 and 16 of FIG. 1. An indicating device 470 is connected to all three monitoring devices 410, 450 and 460 at node 430 for generating a perceptible indication that one of the objects has been removed.

In operation, the object detection device 400 is initially in a ready state. The removal of an object (not shown) from its position near one of the monitoring devices, such as monitoring device 410, generates a trigger signal, and the object detection device 400 enters an operational state. The trigger signal is transmitted to the indicating device 470 to activate it. Indicating device 470 is activated for a predetermined amount of time, after which it is deactivated. Once the indicating device 470 is deactivated, the object detection device 400 returns to the ready state.

Subsequently, the removal of another object from its position near its associated monitoring device, such as monitoring device 450, generates another trigger signal. As a result, the indicating device 470 is again activated for the predetermined amount of time before being deactivated, returning the object detection device 400 to the ready state again.

The preceding operation is continued for all subsequent objects which are removed from their associated monitoring devices.

Considering now the monitoring devices 410, 450 and 460 in greater detail, only monitoring device 410 will be considered hereinafter in greater detail as monitoring devices 410, 450 and 460 are substantially similar.

The monitoring device 410 includes a sensor, such as photoresistor 412, connected at one end to the base of a transistor 411, to generate a situated signal when an object is deposited near the photoresistor 412, and to generate a removed signal when the object has been removed from above the photoresistor 412. A 2,000 ohm resistor 413 is connected between the base and emitter of the transistor 411 to enable the transistor 411 to become forward biased and act as a switch when the photoresistor 412 generates the removed signal.

A 1,000 ohm resistor 415 is connected between the photoresistor 412 and the collector of the transistor 411 at node 420 to facilitate the proper biasing of the transistor 411.

Together, the transistor 411 and resistors 413 and 415 constitute a detecting mechanism to generate an indicating signal. In this regard, when the transistor 411 is switched, the indicating signal is generated, wherein the indicating signal is transmitted to the −V terminal.

Also connected to the collector of transistor 411 is a 0.01 microfarad capacitor 417 to store a charge and to facilitate the generation of a short pulsed trigger signal.

The monitoring devices 410, 450 and 460 are interconnected with one another to ensure that the removal of an object from above the respective photoresistor will generate an indicating signal. In this regard, the monitoring devices 410, 450 and 460 are connected by nodes 414, 416 and 418, respectively, to the common node 428, which terminates at terminal −V, and nodes 420, 422 and 424 of the monitoring devices 410, 450 and 460 are connected to the common node 426, which terminates at terminal +V. In addition, the monitoring devices 410, 450 and 460 are connected to the common node 430.

The indicating device 470 is connected to the monitoring devices 410, 450 and 460 via common nodes 426, 428 and 430. In this regard, indicating device 470 includes a timer device 480, such as a 555 timer device sold by Radio Shack, model number 276-1723, having terminals A, B, C, D, E, F, G and H to act as a monostable device for generating a switching signal at terminal H in response to the detection of the trigger signal, wherein the duration of the switching signal is adjusted by varying the variable resistor VR. Common node 426 is connected to timer device 480 at terminals F and G. A 47,000 ohm resistor 472 and variable resistor 474 are connected between common node 426 and terminal E to facilitate the adjustment of the length of time that the indicating device 470 is activated. The common node 426 terminates at terminal +V where a power source is connected.

The common node 428 is attached to the timer device 480 at terminal A and to terminal −V. A 47,000 microfarad capacitor 476 is connected between common node 428 and terminal D and a 0.01 microfarad capacitor 478 is connected between common node 428 and terminal B. Common node 430 is connected to the timer device 480 at terminal C to complete the timer device 480 connections. A 10,000 ohm resistor 480 connects the capacitor 417 to common node 428.

The indicating device 470 further includes a switch device 490 which is normally open and is connected between terminal H of timer device 480 and common node 428 to activate an indicator 495. The switch device 490 is closed in response to the switching signal, thereby activating indicator 495 for the duration of the switching signal. Preferably, indicator 495 is activated for a period of between about 1 and 10 seconds. More preferably, indicator 495 is activated for a period of between about 3 and 5 seconds.

In operation, the capacitor 417 is initially charged up, as are the other similarly situated capacitors of monitoring devices 450 and 460, to place the object detection device 400 in the ready state.

Upon the removal of an object from the proximity of the photoresistor 412, light is permitted to strike the photoresistor 412, causing the resistance of the photoresistor 412 to decrease. As a result, the photoresistor 412 generates a removed signal and the object detection device 400 is placed in the operational state.

In the operational state, the voltage at the base of transistor 411 increases due to the removed signal causing the transistor 411 to be properly biased for switching on and generating an indicating signal.

Once the transistor 411 is switched on, the capacitor 417 quickly discharges, resulting in the voltage at node 430 to abruptly change, and thereby generating a trigger signal pulse. The trigger signal pulse is detected by the timer 480, which then generates and transmits the switching signal to the switch device 490. The switching signal causes the switch device 490 to be energized, thereby closing the switch device 490 and completing the electrical circuit from +V through the indicator or annunciator 495 to −V to cause it to be activated.

The switch device 490 remains closed for the entire desired activation period while the switching signal is generated before being automatically de-energized by the timer device 480. Once the switch device 490 is de-energized, the indicator 495 is deactivated and the object detection device 400 returns to the ready state.

The length of the switching signal, or the period of activation of the indicating device 470, can be adjusted by varying the resistance of variable resistor 474. In this way, the desired length of time which the indicator 495 is activated after the removal of the object can be adjusted.

The remaining monitoring devices 450 and 460 are similarly operated to generate a trigger signal pulse when an object is removed from a position near the respective sensor devices.

Figure 5:
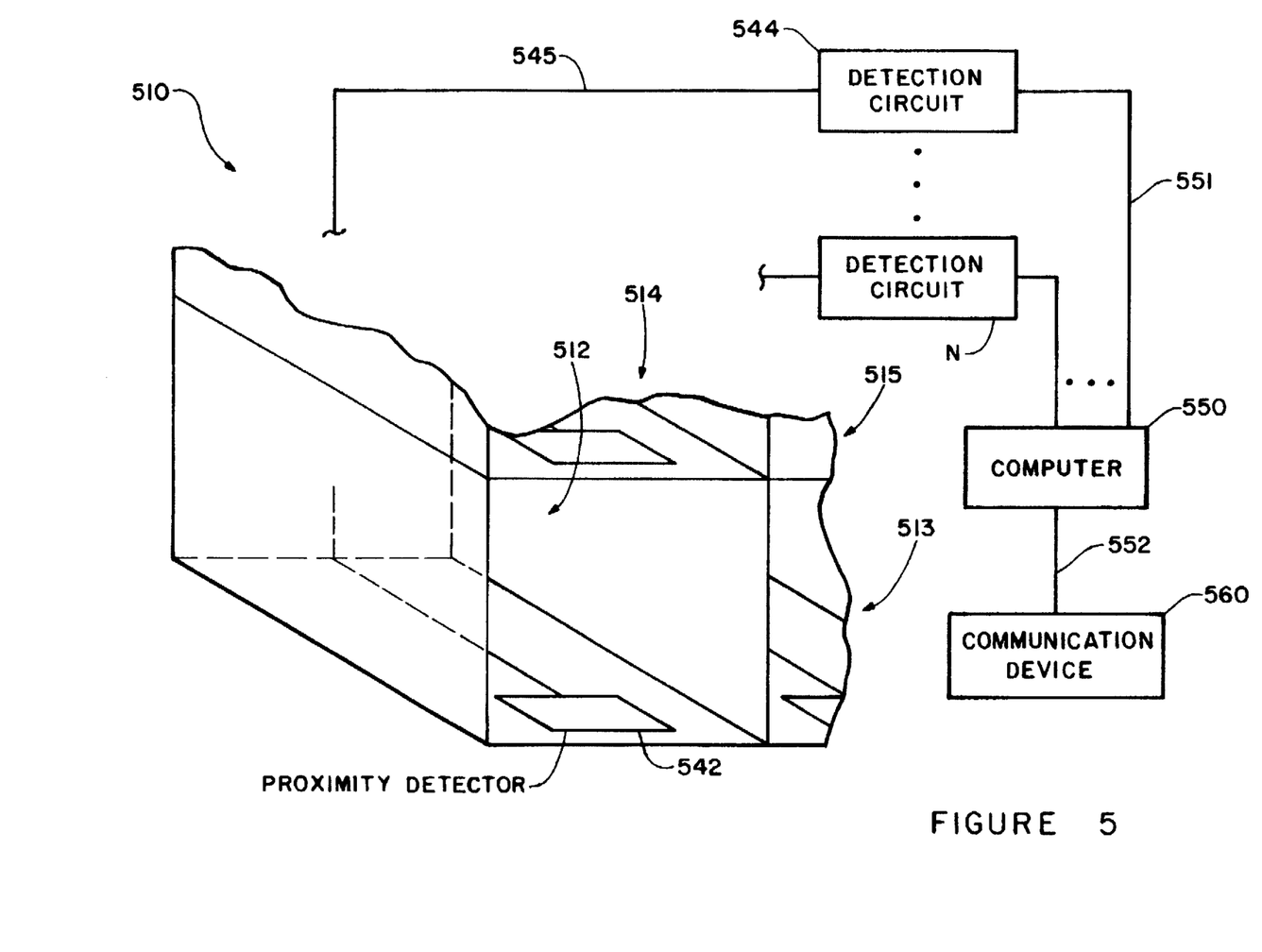
FIG. 5 is a block diagram of another inventory control apparatus for use with a postal receptacle, which is constructed according to the present invention.

Referring now to FIG. 5, there is shown a detection apparatus 510 for use with postal receptacles, such as postal receptacles 510–515. As the construction of the inventory control apparatus 510 is substantially similar for the receptacles 512–515, only the postal receptacle 512 will be considered hereinafter in greater detail.

The detection apparatus 510 includes a proximity detector 542 disposed within the postal receptacle 512 to generate an electrical status signal when an object is received within the postal receptacle 512, and a detection device 544 connected to the proximity detector 542 by conductor 545 to sense the status signal from the proximity detector 542 and to generate an indicating signal in response thereto.

Unlike the sensor devices of the previous embodiments, the proximity detector 542 of inventory control apparatus 510 generates a received signal when the object obstructs the proximity detector 542, rather than when the object is removed from its position adjacent to the proximity detector 542. One skilled in the art can readily make the modifications to an object detection device, such as object detection device 40 of FIG. 2, to accomplish this task.

The detection apparatus 510 further includes a computer 550 connected to detection device 544 by conductor 551 to receive and process the indicating signal. The computer 550 similarly cooperates with receptacles 513–515 to receive and process indicating signals therefrom. In this regard, the receptacles 513–415 have an associated sensor device (not shown) connected to an associated detection circuit, such as detection circuit N. In this way, a plurality of postal receptacles can be simultaneously monitored by the computer 550.

The computer 550 contains stored information for each of the receptacles 512–515, such as the phone numbers of the persons renting the receptacles 512–515 and any appropriate messages for relaying to those persons upon the detection of an indicating signal. Each detection circuit 554–N associated with the receptacles 512–515 is assigned an address within the computer 550.

A look-up table permits the computer 550 to correlate the address of the detection circuits 544-N which are generating an indicating signal with the stored information. A communications device 560 connected to computer 550 by conductor 552 enables the computer 550 to transfer the stored information to a user at a remote location. For example, the communications device 560 could automatically contact the user with telecommunications devices including a pager to transmit the stored information to the user. Alternatively, the user could use a telephone to contact the communication device 560 to access the stored information in the computer 550.

In operation, the proximity detector 542 senses the placement of a postal piece within the postal receptacle 512 and generates a received signal in response thereto. Similarly, the proximity detectors (not shown) of the other receptacles 513-515 generate a received signal in response to the placement of a postal piece within the respective receptacle.

The received signal is sent to the detection device 544, which generates an indicating signal in response thereto. The indicating signal is sent to an address within the computer 550 for processing. The computer 550 performs a look-up function to match the address which received the indicating signal with previously stored information, such as the telephone number of the user renting the receptacle 512 and a message to be relayed, such as "mail received in box 512," and retrieves the information for processing.

Once the information has been retrieved, it can be automatically transmitted to the user via communications device 560. Alternatively, the user can access the retrieved information by telephoning the communications device 560.

From the foregoing, it will be understood that a plurality of postal receptacles, such as postal receptacles 512-515, may be simultaneously monitored by computer 550. In this way, a large number of users may obtain information regarding the contents of their postal receptacle from a remote location.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An inventory control apparatus for use in an establishment including a plurality of existing open shelves having a variety of merchandise displayed thereon to enable the establishment to monitor the removal of an individual item of merchandise from at least one of the shelves without restricting customer access to the at least one shelf, each one of the shelves having an outer lip extending upwardly from a top surface, the inventory control apparatus comprising:

portable base means to position on top of the at least one shelf for receiving the merchandise item thereon to facilitate the monitoring of the merchandise item, wherein said portable base means is not fixed to the at least one shelf to enable said portable base means to be relocated and repositioned on another one of the plurality of shelves for monitoring other items of merchandise;

sensor means coupled to said portable base means for sensing the status of the merchandise item relative to said portable base means to generate a situated signal when the merchandise item is in the proximity of said sensor means, and to generate a removed signal when the merchandise item is not in the proximity of said sensor means, wherein the merchandise item is disposed on said portable base means to cooperate with said sensor means for generating said situated signal and said removed signal;

detection means connected to said sensor means for generating an indicating signal to identify the status of the merchandise item;

annunciator means connected to said detection means for indicating the status of the merchandise item relative to said sensor means to enable the establishment to monitor the presence or absence of the merchandise item on said portable base means;

said sensing means includes a photoresistor;

said annunciator means includes a light emitting diode;

said annunciator means includes a speaker;

wherein said sensor means and said detection means are connected to form a monitoring means for generating a trigger signal when the merchandise item is removed from the proximity of said sensor means, wherein said trigger signal is generated in response to said detection means generating said indicating signal;

said annunciator means includes a timer means for generating a switching signal of variable duration to control the period of time that said annunciator means is activated;

a switch means responsive to said switching signal to activate said annunciator means;

a plurality of said monitoring means, wherein each of said monitoring means is connected to said timer means by a common node, and wherein said timer means generates said switching signal each time one of said monitor means generates said trigger signal;

said timer means includes a control means to vary the duration of said switching signal;

said portable base means includes a planar member and a pair of spaced apart support members to support said planar member above the top surface of the at least one shelf, wherein one of said support members engages the outer lip of the at least one shelf to prevent the inventory control apparatus from sliding off of the top surface; and a power source disposed on said portable base means and coupled to said monitoring means for providing electrical energy.

* * * * *